United States Patent [19]

Yamashita et al.

[11] Patent Number: 5,107,723
[45] Date of Patent: Apr. 28, 1992

[54] SELECT SHOCK ATTENUATION ARRANGEMENT FOR AN AUTOMATIC AUTOMOTIVE TRANSMISSION

[75] Inventors: Hiroshi Yamashita, Zama; Katsumi Nawata, Ebina; Shigeru Ishii, Atsugi, all of Japan

[73] Assignee: Nissan Motor Co., Ltd., Yokohama, Japan

[21] Appl. No.: 443,941

[22] Filed: Dec. 1, 1989

[30] Foreign Application Priority Data

Dec. 9, 1988 [JP] Japan ................. 63-311543

[51] Int. Cl.$^5$ ............... F16H 59/68; F16H 59/24
[52] U.S. Cl. .................................. 74/866; 364/424.1
[58] Field of Search ............... 74/866, 867; 364/424.1

[56] References Cited

U.S. PATENT DOCUMENTS

| | | | |
|---|---|---|---|
| 4,308,764 | 1/1982 | Kawamoto | 74/866 |
| 4,519,273 | 5/1985 | Shimizu et al. | 74/866 X |
| 4,730,521 | 3/1988 | Hayasaki et al. | 74/867 |
| 4,732,246 | 3/1988 | Tateno et al. | 74/866 X |
| 4,836,055 | 6/1989 | Suzuki | 74/866 |
| 4,845,618 | 7/1989 | Narita | 74/866 X |
| 4,873,637 | 10/1989 | Braun | 74/866 X |
| 4,890,515 | 1/1990 | Taniguchi et al. | 74/866 |
| 4,939,957 | 7/1990 | Asano et al. | 74/867 X |
| 4,949,595 | 8/1990 | Shimanaka | 74/867 X |
| 4,981,053 | 1/1991 | Yamaguchi | 74/867 X |

FOREIGN PATENT DOCUMENTS

| | | |
|---|---|---|
| 2137580 | 6/1972 | Fed. Rep. of Germany . |
| 57-25550 | 2/1982 | Japan . |
| 61-282135 | 12/1986 | Japan . |
| 62-62047 | 3/1987 | Japan . |
| 62-103234 | 5/1987 | Japan . |

Primary Examiner—Leslie A. Braun
Assistant Examiner—Khoi Q. Ta
Attorney, Agent, or Firm—Foley & Lardner

[57] ABSTRACT

In order to reduce select shock the engine load is monitored and if the level is above a predetermined at the time the shift lever is moved from a range wherein torque is not transmitted through the transmission (e.g. neutral or park ranges) to a range wherein torque transmission is enabled (viz., D, I, II, R), the level of hydraulic line pressure is reduced by a predetermined amount for a predetermined period to temporarily reduce the engagement force.

3 Claims, 3 Drawing Sheets

SELECT SHOCK ATTENUATION ARRANGEMENT FOR AN AUTOMATIC AUTOMOTIVE TRANSMISSION

BACKGROUND OF THE INVENTION

1. Field of the Invention

The present invention relates generally to automotive transmissions and more specifically to a select shock attenuation arrangement for such a transmission.

2. Description of the Prior Art

JP-A-57-25550 disclose a select shock attenuation arrangement for an automotive transmission which is arranged so that, when the transmission select lever is moved from neutral to a range which will produce a forward speed, the engagement of the friction element which is essential to all forward speeds is engaged with a timing which is delayed with respect to the other elements which are engaged to produce the gear in which the vehicle will start off from. This reduces the so called "creep" phenomenon and thus inherently reduces the shock which results from the above mentioned neutral forward type speed select (e.g. N-D N-II or N-I).

However, this arrangement has suffered from the drawback that, due to the delay with which the friction element which is critical to all forward speeds is engaged, if the engine speed is increased immediately after a neutral forward speed select in response to a deep depression of the accelerator pedal (indicative of a demand for quick engagement) due the absence of engagement the engine speed is permitted to rapidly increase (i.e momentarily race) whereby the difference in the rotational speed between the driving and driven elements of the transmission increases to a level which induces a marked engagement shock when the friction element in question finally engages.

This shock is not only undesirable from the point of passenger comfort but also has a detrimental effect on the longevity of the power train.

SUMMARY OF THE INVENTION

It is an object of the present invention to provide a select shock attenuation arrangement which is responsive to engine load and which reduces the pressure of the hydraulic fluid (line pressure) with which the friction elements are engaged, by a selected amount for a given time, when the load is above a given level.

More specifically, a first aspect of the present invention is deemed to comprise an automatic transmission which includes a source of hydraulic line pressure, which is operatively connected with an engine and which features: means for detecting the selection of a drive range and producing a first signal indicative thereof; means for sensing a parameter which is indicative of engine load and producing a second signal indicative thereof; means responsive to the first and second signals for determining if the engine load exceeds a predetermined level within a predetermined period following the issuance of the first signal; and means for reducing the level of line pressure by a predetermined amount for a predetermined period.

A second aspect of the present invention is deemed to comprise an automotive vehicle which features: an engine; a transmission, which is operatively connected with the engine and which includes a source of hydraulic line pressure; a plurality of friction elements which are operated by the hydraulic line pressure; a planetary gear train which is operatively associated with said plurality of friction elements; a control valve assembly which selectively controls the supply of line pressure to the plurality of friction elements; means for controlling the level of the line pressure; a manually operable gear selector, the gear selector being operatively connected with the transmission movable between a first position wherein the transmission is conditioned so that torque can not be transmitted therethrough, to a second position wherein the transmission is conditioned to transmit torque therethrough; first sensor means for sensing the movement of the gear selector from the first position to the second position, and for producing a first signal indicative thereof; second sensor means for sensing a parameter which varies with the load on the engine and producing a second signal indicative thereof; and a control circuit, the control circuit being operatively connected with the first and second sensor means and the line pressure control means, the control circuit including means responsive to the first and second signals for determining if the engine load exceeds a predetermined level within a predetermined period following the issuance of the first signal, and for controlling the line pressure control means to reduce the level of line pressure by a predetermined amount for a predetermined period following the determination.

A third aspect of the present invention is deemed to comprise a method of attenuating friction element engagement shock in a transmission which is operatively connected with an engine and which includes a controllable source of line pressure, the method featuring the steps of sensing the magnitude of a parameter indicative of engine load sensing the occurrence of a select operation which changes the transmission from a first state wherein torque is not transmittable therethrough to a second state wherein torque is transmitted therethrough; comparing the sensed magnitude of the engine load indicative parameter with a predetermined level for a first predetermined following the occurrence of the select operation; and reducing the level of line pressure by a predetermined amount for a second predetermined time in the event that the sensed magnitude exceeds the predetermined level.

DETAILED DESCRIPTION OF THE EMBODIMENTS

Figure 1:
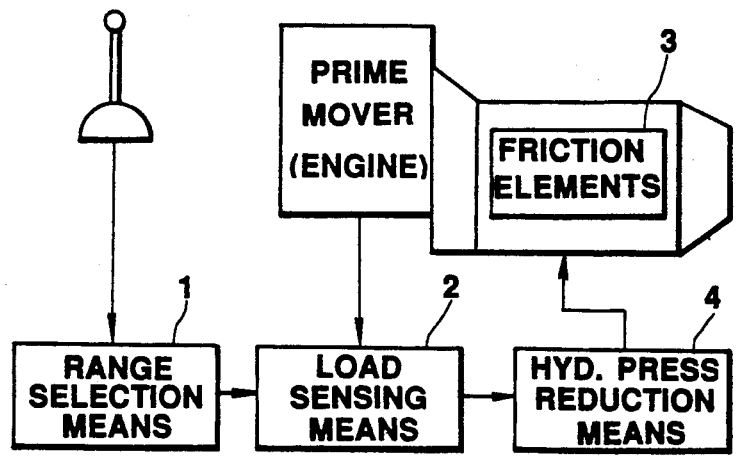
FIG. 1 is a block diagram showing the concept of the present invention.
Figure 2:
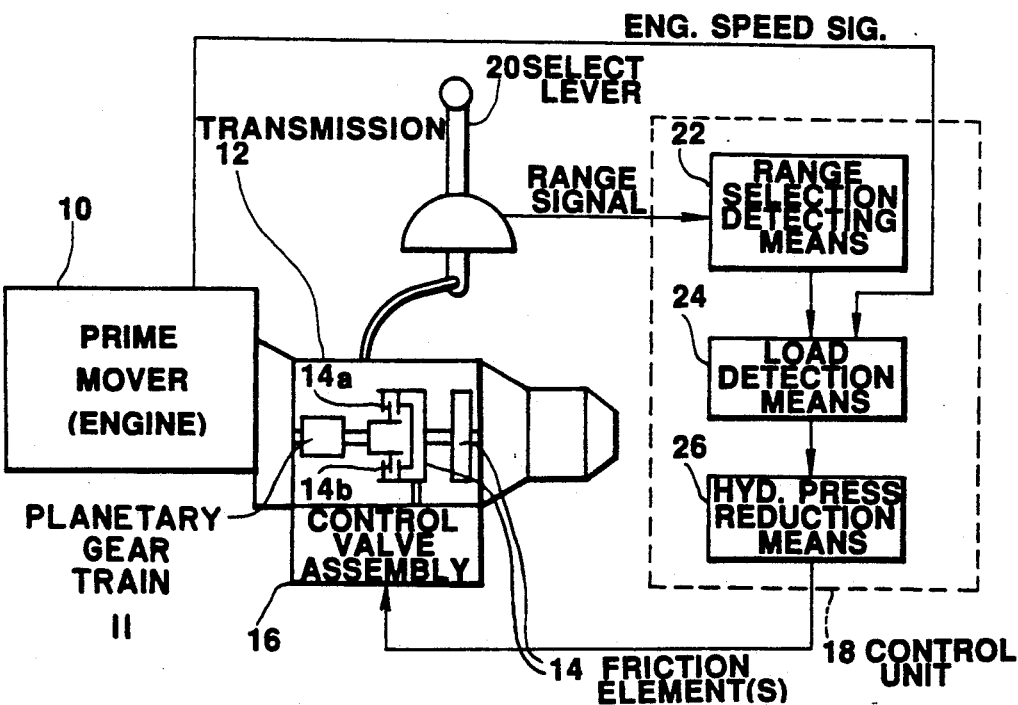
FIG. 2 is a schematic diagram showing the arrangement

FIG. 1 shows the concept of the present invention while FIG. 2 shows an embodiment thereof in schematic diagram form.

In the illustrated embodiment, an engine 10 is operatively connected with an automatic transmission 12 and arranged to transmit the power produced by the engine to the drive wheels of a vehicle (neither shown). The transmission includes a gear train comprised of one more more planetary gear units 11 and one or frictional elements 14, which include for example clutches or brakes, which are operatively arranged therewith.

A control valve assembly 16 is disposed at the bottom of the transmission. This assembly contains a plurality of spool and/or solenoid valves via which the supply of line pressure to the various friction elements of the transmission is selectively controlled.

In this embodiment the control valve assembly 16 is in part controlled in response to signals which are supplied from a control circuit 18 and is constructed in a manner such as disclosed in JP-A-62-62047 for example.

The transmission 12 includes an oil pump which is operatively driven by the engine 10. The output of the pump is modified in a manner to produce a so called hydraulic line pressure which is supplied to, or drained from the above mentioned friction elements in accordance with a predetermined engine load/vehicle speed control schedule. As is conventional, the clutch 14 is comprised of a plurality of interleaved driving and driven plates 14a, 14b which are arranged to the rotatable relative to one another and which are brought into torque transmitting engagement when the line pressure is supplied into a servo chamber which is defined within the device.

The level of the line pressure is controlled by a line pressure regulator valve. An example of such a valve can be found in JP-A-62-62047.

In this embodiment the line pressure regulator valve is arranged to be controlled by a solenoid valve which is operated in an ON/OFF manner by a signal having a variable duty cycle. Depending on the degree of depression of the vehicle accelerator pedal (viz., a parameter indicative of the opening degree of the engine throttle valve, or a similar engine load indicative parameter) the duty cycle of the signal supplied to the line pressure regulator valve control solenoid is varied in a manner which varies the level of the line pressure within the transmission.

A select lever 20 is operatively connected with the transmission 12 and is arranged to be selectively moved between a plurality of ranges such as: drive (D), manual second (II), manual first (I), reverse (R), neutral (N) and park (P).

In the instant embodiment the control unit 18 is arranged to contain a circuitry/means 22, 24, 26 for detecting the change range selection, engine load and for reducing the hydraulic line pressure level, respectively.

An inhibitor switch can be used to produce the signal indicative of the instant range selection and thus enable circuit 22 to discern movements of the shift lever between a N-D N-R and the like positions.

In the illustrated arrangement, engine speed is used to indicate engine load. A signal indicative of the engine speed and a signal indicative of the nature of any pertinent movement of the select lever are fed to the load detection circuit/means 24 wherein it is determined if the engine speed exceeds a predetermined limit within a predetermined period following the issuance of a signal indicative that the shift lever has been moved from neutral to a range in which power will be caused to be transmitted through the transmission to the driven wheels of the vehicle. In the event that such a condition is detected, a signal is issued to the hydraulic line pressure reduction circuit/means 26 for a predetermined period of time. This signal induces the duty cycle of the signal which is supplied to the solenoid which controls the level of the hydraulic line pressure, to be changed in a manner which lowers the line pressure level by a predetermined amount.

The above mentioned three circuit means 22, 24 and 26 have been illustrated as individual elements simply for the sake of explanation. In actual practice the functions thereof are performed by a microprocessor which is used for other engine or transmission control.

Figure 3:
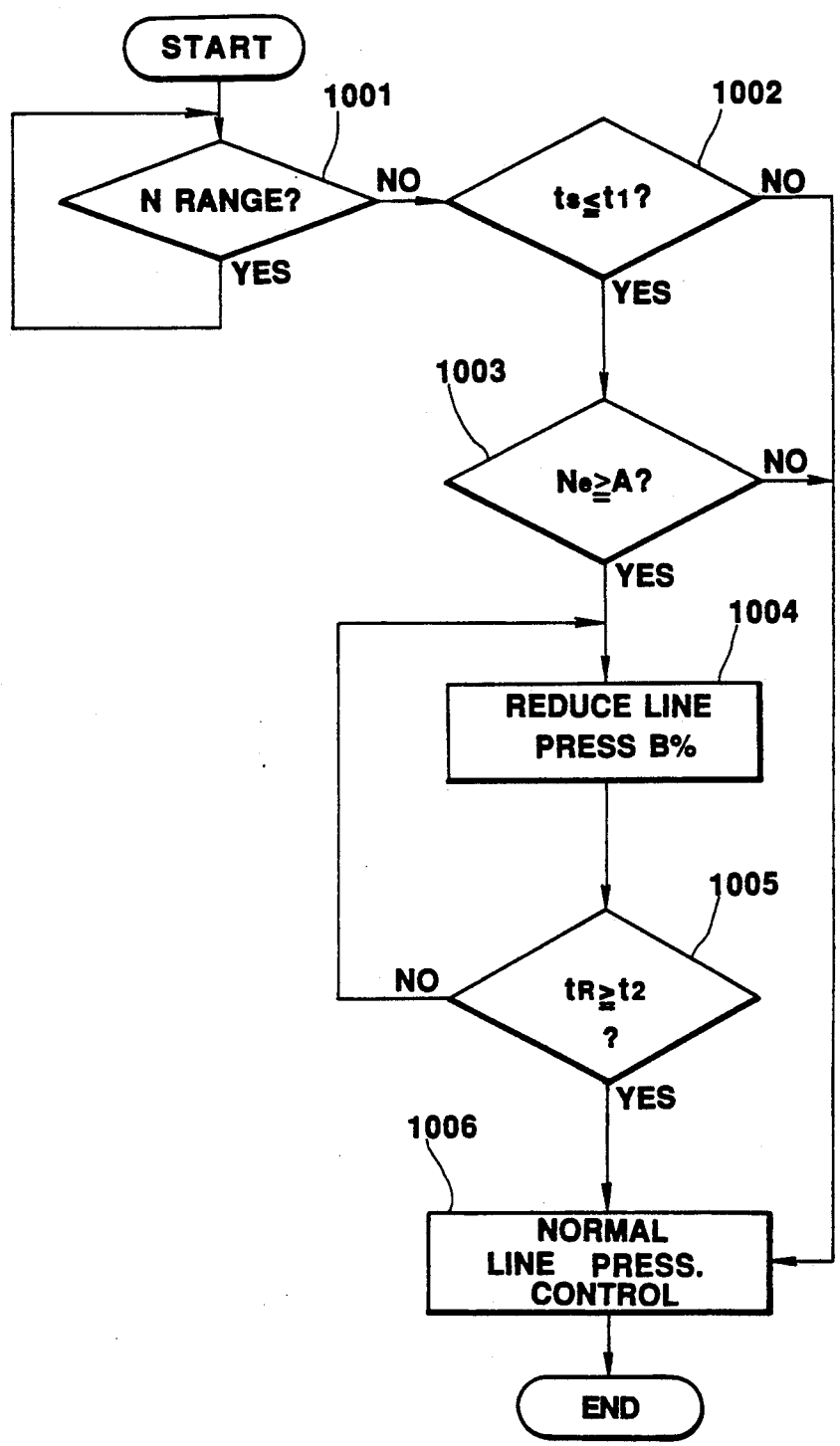
FIG. 3 is a flow chart depicting the steps which characterize the operation of embodiment shown in FIG. 2.
Figure 4:
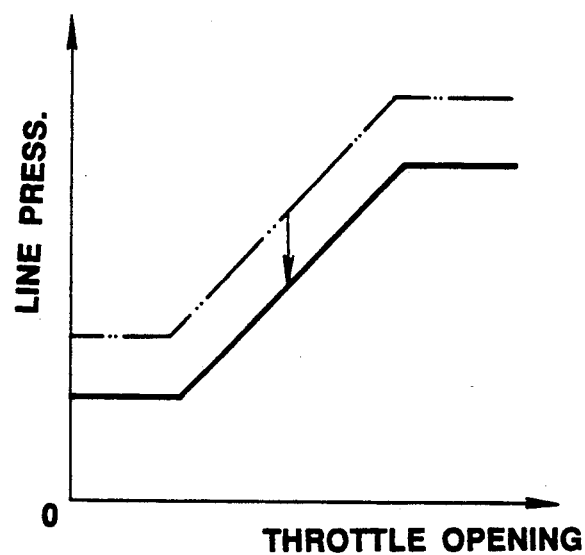
FIG. 4 is a graph which shows in terms of throttle opening and line pressure level, the line pressure level reduction characteristics which are achieved in accordance with the present invention.

FIG. 3 shows a flow chart which depicts the operations which are performed by a control program which is run in the above mentioned microprocessor. By way of example, the program can be run at predetermined time intervals. As shown, each time the program is run, the output of the inhibitor switch is sampled and it is determined if the transmission select lever is set in neutral (N) or not. When a negative outcome occurs the routine flows to step 1002 wherein a first timer tS (e.g. soft clock) is set running. Until the count of this timer exceeds a value of t1 the routine flows to step 1003 wherein the engine speed signal is sampled to determine if the engine speed is equal to or greater than a predetermined value A.

While the engine speed is lower than A the routine flows around to step 1006 wherein the line pressure level is controlled in accordance with the normal control schedule. Viz., if the engine speed is below A then the normal level of line pressure for the instant set of operating circumstance (a level determined in accordance with the opening of the engine throttle valve) will be appropriate and excessive select shock will not be produced. However, if the engine speed is equal to or greater than A, then in order to obviate the generation of such a shock, the level of line pressure which would normally be produced is reduced a predetermined percentage (B%). Following this, a second timer tR is set running. Until the count of this timer or soft clock reaches a value of t2, the program recycles to to step 1004. Upon the completion of the count, the routine flows to step 1006 wherein the temporary line pressure level reduction is stopped and normal control returned.

Figure 5:
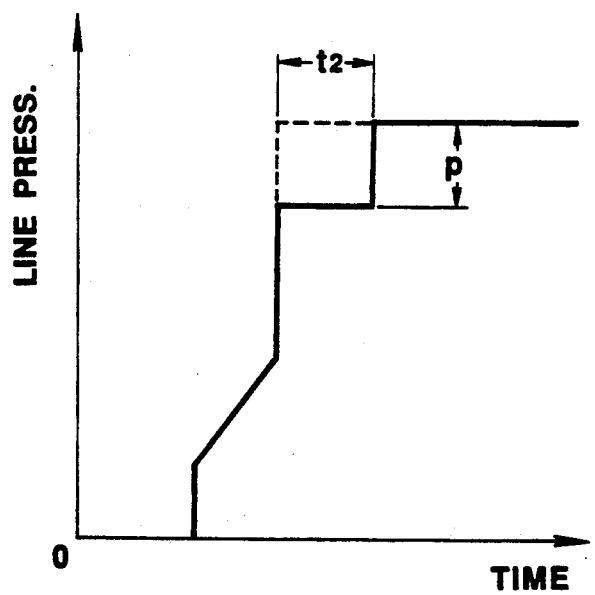
FIG. 5 is a graph which shows in terms of time and line pressure, the timing with which the line pressure level reduction is controlled in accordance with the present invention.

The solid line trace in FIG. 5 shows the effect provided by the above described control, while the broken line indicates the line pressure characteristics which would be produced in the absence of the same. As will be noted the level of line pressure is reduced by an amount p for a period of t2.

With this control, if the relative rotation between the driving and the driven plates 14a, 14b in the clutch 14 is high as will be the case if the engine speed is high, the level of line pressure which is supplied to the whole transmission is temporarily subject to a slight reduction. Accordingly, the clutch capacity at the time of engagement is temporarily reduced with the result that the inertial effects which cause shock are reduced to the degree that engagement shock is markedly attenuated.

With the instant invention, it is possible to reduce the select shock not only with forward speed selections but with reverse gear as well. However, the present invention is not limited to selects which are made from neutral (N) and can be applied selections which are made from parking (P) range to the above mentioned ranges in which torque transmission through the transmission is rendered possible, if so desired.

Further, although engine speed is used in the disclosed embodiment to indicate engine load, it is within the scope of the present invention to use engine throttle valve position or accelerator pedal depression degree in lieu thereof if so desired. The possibility of a combination of such parameters is not excluded.

It is also within the scope of the present invention to control the level of line pressure by controlling the amount of line pressure which is drained off via a suitable arrangement in lieu of using a line pressure control solenoid valve of the nature used in the disclosed embodiment.

Further, the present invention is not limited to any one friction element or transmission type and can be suitably applied as deemed appropriate to reduce shock and the like type of undesirable phenomena.

What is claimed is:

1. In an automatic transmission which includes a source of hydraulic line pressure, a plurality of friction elements which form part of the transmission and which are operated by the hydraulic line pressure, a planetary gear train which forms part of the transmission and which is operatively associated with said plurality of friction elements, and a control valve assembly which selectively controls the supply of line pressure to said plurality of friction elements, said transmission being connected with an engine by means other than said plurality of friction elements:

means for detecting the selection of a drive range and producing a first signal indicative thereof;

means for sensing a parameter which is indicative of engine load and producing a second signal indicative thereof;

means responsive to said first and second signals for determining if the engine load exceeds a predetermined level within a predetermined period following the issuance of the first signal; and means for reducing the level of the hydraulic line pressure by a predetermined amount for a predetermined period.

2. In an automotive vehicle an engine;

a transmission, said transmission being operatively connected with said engine, said transmission comprising:

a source of hydraulic line pressure;

means for controlling the level of said hydraulic line pressure;

a plurality of friction elements which are operated by said hydraulic line pressure;

a planetary gear train which is operatively associated with said plurality of friction elements;

a control valve assembly which selectively controls the supply of line pressure to said plurality of friction elements;

a manually operable gear selector, said gear selector being operatively connected with said transmission movable between a first position wherein the transmission is conditioned so that torque can not be transmitted therethrough, to a second position wherein said transmission is conditioned to transmit torque therethrough;

first sensor means for sensing a movement of said gear selector from said first position to said second position, and for producing a first signal indicative thereof;

second sensor means for sensing a parameter which varies with engine load and producing a second signal indicative thereof; and a control circuit, said control circuit being operatively connected with said first and second sensor means and said hydraulic line pressure control means, said control circuit including means responsive to said first and second signals for determining if the engine load exceeds a predetermined level within a predetermined period following the issuance of the first signal, and for controlling said line pressure control means to reduce the level of the hydraulic line pressure by a predetermined amount for a predetermined period following the determination.

3. A method of attenuating friction element engagement shock in a transmission which is operatively connected with an engine and which includes a controllable source of hydraulic line pressure, comprising the steps of:

sensing the magnitude of a parameter indicative of engine load;

sensing the occurrence of a select operation which changes the transmission from a first state wherein torque is not transmittable therethrough to a second state wherein torque is transmitted therethrough;

comparing the sensed magnitude of the engine load indicative parameter with a predetermined level for a first predetermined time following the occurrence of said select operation; and reducing the level of the hydraulic line pressure by a predetermined amount for a second predetermined time in the event that the sensed magnitude of the parameter indicative of engine load exceeds the predetermined level during the first predetermined period of time.

* * * * *